Aug. 17, 1965
J L. WHISENHUNT
NARROW BAND TRANSISTOR RADIO EMPLOYING CRYSTAL CONTROLLED OSCILLATOR
Filed Aug. 29, 1960
3,201,697
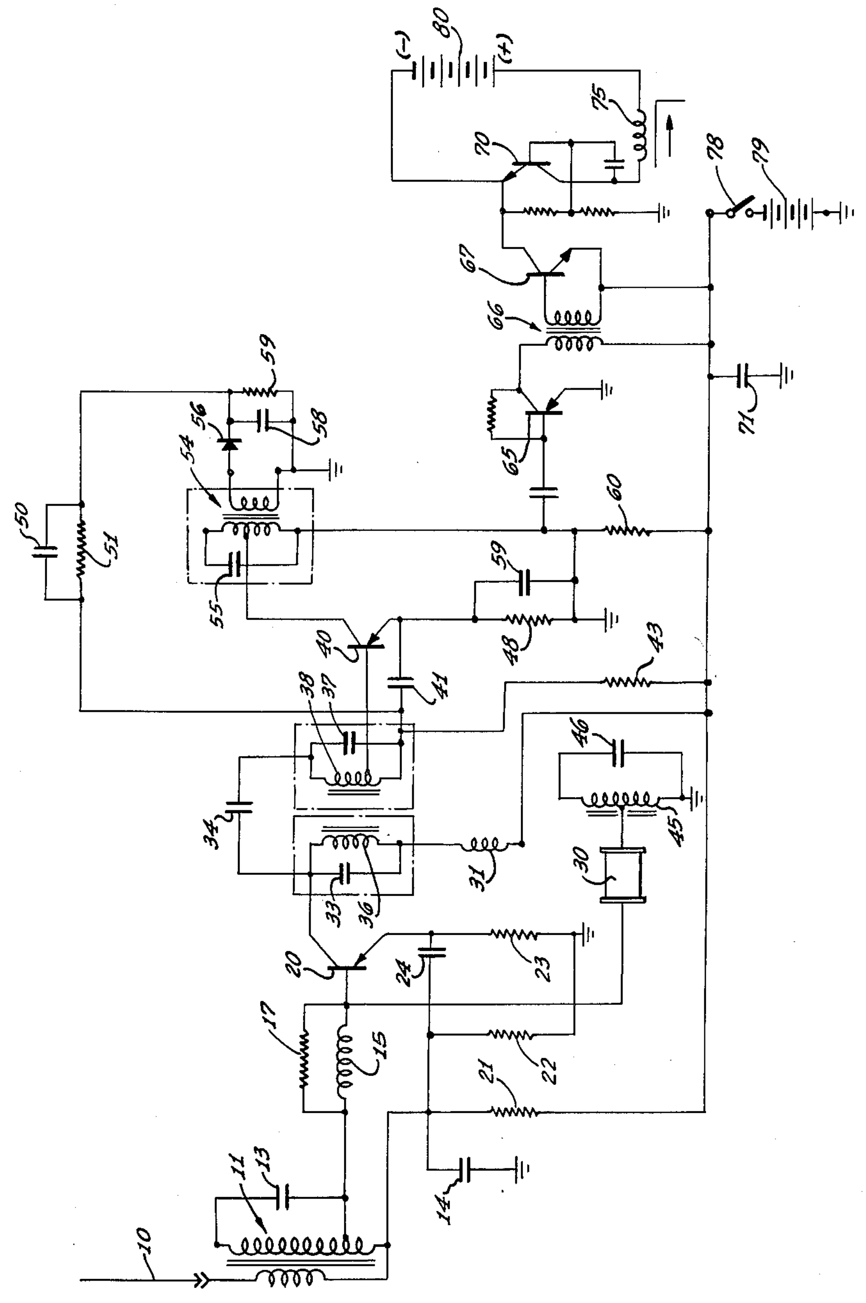
INVENTOR.
J L. Whisenhunt
By Smyth, Roston & Pavitt
Attorneys.

3,201,697

NARROW BAND TRANSISTOR RADIO EMPLOYING CRYSTAL CONTROLLED OSCILLATOR

J. L. Whisenhunt, Reseda, Calif., assignor to Packard-Bell Electronics Corporation, Los Angeles, Calif., a corporation of California Filed Aug. 29, 1960, Ser. No. 52,576
11 Claims. (Cl. 325—451)

This invention relates to radio receivers and, more particularly, to narrow band transistor receivers for remote control applications.

The spectrum allotted for remote control applications is quite narrow with the five channels in the spectrum being closely spaced. Each channel has a bandwidth of 50 kilocycles, and the spectrum is at 27 megacycles so that even a small percentage of frequency drift causes interference between channels. To prevent such interference, a maximum drift of 0.01 percent should be maintained. For such applications, crystal controlled oscillators are generally utilized in a heterodyne receiver arrangement. For hobby use, however, cost factors are of considerable importance and the provision of a separate crystal oscillator is expensive. Furthermore, conventional autodyne receivers, which utilize a single stage for detection and for producing the intermediate frequency, are relatively inexpensive but have poor frequency stability.

In an illustrative embodiment of this invention, a highly stable autodyne receiver is provided utilizing a crystal controlled oscillator. The single stage includes a transistor, and a crystal tuned to a heterodyning frequency which forms part of a feedback path across the transistor. The crystal is not included as part of any of the biasing circuitry coupled to the transistor electrodes. A choke coupled between the transistor input terminal and the antenna effectively isolates the latter from the feedback signal. Features of the invention relate to the provision of a choke in the single stage for both isolation and oscillation developing functions. By isolating the antenna, antenna tuning does not affect the gain of the single stage or the magnitude of the oscillations.

Further features of this invention pertain to the provision of a narrow band transistor receiver which is low in weight, small in size and economical. This feature is achieved in a crystal controlled single autodyne stage, and without interaction between stages.

Further advantages and features of this invention will become apparent upon consideration of the following description when read in conjunction with the drawing wherein the single figure is a circuit representation of the transistor receiver of this invention.

Referring to the single figure, a radio receiver is depicted for receiving a high frequency carrier, illustratively, at 27,455 kilocycles. The carrier may be modulated by a burst of audio frequency, illustratively, at 500 cycles per second. The receiver depicted in the single figure function to recover the audio frequency and to perform a control function responsive thereto. As is hereinafter described, the receiver includes means for heterodyning the carrier to derive an intermediate frequency signal at 455 kilocycles. The carrier is received at an antenna 10 which is coupled to the primary winding of a transformer 11. The primary winding may illustratively have three turns and a secondary winding may have a total of 19 turns. The ends of the primary and secondary windings of the transformer 11 opposite to antenna 10 are coupled together and through an isolating capacitor 14 to ground. The capacitor 14 may have a value of 0.02 microfarad. A portion of the secondary of the transformer 11, illustratively 15½ turns, is shunted by a capacitor 13 and the tap on the secondary of the transformer 11 is coupled by a choke 15 to the base electrode of a PNP junction type transistor 20. The capacitor 13 may have a value of 15 micromicrofarads, and the choke 15, which is shunted by a resistor 17 having a value of 2,200 ohms, may have a value of 2 microhenries.

The choke 15 and the transistor 20 are components of a single transistor stage which performs a number of different functions in the transistor receiver of this invention. The single converter, which may be referred to as an autodyne stage or autodyne oscillator, functions to develop a heterodyning signal having a frequency of 27 megacycles, to mix the heterodyning signal with the carrier, and to amplify the resulting intermediate frequency of 455 kilocycles.

In addition to the transistor 20, and the choke 15, the single stage includes another important component in the form of the crystal 30. The crystal 30 is not, however, connected as part of any of the biasing circuitry of the transistor 20.

The collector electrode of the transistor 20 is biased over a path from a negative battery 79 through an on-off switch 78, a winding 31 and a winding 36. The two windings 31 and 36, which are serially connected, form primary windings of an inductive or transformer coupling to the windings 38 and 45, both of which are hereinafter described. The winding 36, having illustratively 220 turns, is shunted by a capacitor 33 having a suitable value of 190 microfarads to form together with the winding 36 a circuit arrangement tuned to the intermediate frequency. As indicated above, this frequency may be 455 kilocycles. The secondary winding 38, which may have 195 turns is shunted by a capacitor 37 and connected by a capacitor 34 to the winding 36. The capacitors 37 and 34 may have respective values of 190 micromicrofarads and 3.5 micromicrofarads each.

The arrangement, including the windings 36 and 38 and the capacitors 33 and 37 may provide for narrow band tuning at the intermediate frequency, illustratively, 10 kilocycles wide.

The battery 79, mentioned above, may provide a potential illustratively of 9 volts, and is connected or shunted to ground by a capacitor 71 when the switch 78 is closed. The capacitor 71 may have a value of 100 microfarads. The output of the single stage is taken from a tap on the secondary winding 38, which is coupled to an intermediate frequency amplifier including a PNP transistor 40. The intermediate frequency amplifier is hereinafter described.

The emitter electrode of the transistor 20 is coupled to ground by a resistor 23 having a value of 1 kilohm. The winding 31 in the collector circuit of the transistor 20 is inductively coupled to the winding 45 which is part of a feedback path between the collector and the base electrodes of the transistor 20. The winding 45 is shunted by a capacitor 46 having a suitable value such as 15 microfarads, and has one terminal coupled to ground. A tap of the winding 45 is connected to the crystal 30, mentioned above, having a particular resonant frequency, illustratively, of 27 megacycles. The other terminal of the crystal 30 is coupled directly to the base electrode of the transistor 20.

The crystal 30 in the feedback path is energized to develop a feedback potential at a frequency of 27 megacycles across the choke 15 in the base circuit of the transistor 20. The transistor 20 oscillates due to the feedback potential even in the absence of the reception of a signal at the antenna 10. The choke 15 performs a double function in that it develops the feedback potential at the base electrode of the transistor 20 and it also serves to isolate the transistor 20 from the antenna 10. The choke 15 attenuates the radio frequency input signal somewhat and if the choke is too large, the attenuation is too great and the sensitivity of the receiver poor. If, on the other hand, the choke 15 is too small, sufficient feedback potential is not developed at the base electrode of the transistor 20 so that the autodyne stage, including the transistor 20, does not oscillate. The size of the choke 15 is then a compromise between these opposing factors.

Likewise it is desirable to isolate the transistor 20 from the antenna 10 with choke 15 because the magnitude of the oscillation of the autodyne stage otherwise would be affected by the tuning of the antenna 10. The antenna 10 may be tuned by moving a magnetic slug, not shown, in the transformer 11. The shunt resistor 17 across the choke 15 lowers the "Q" of the base circuit of the transistor 20 to flatten the frequency response in the range of the carrier frequency.

The base electrode of the transistor 20 is biased over a path including the choke 15, the lower portion of the secondary winding of the transformer 11 and a resistor 21 to the battery 79. The resistor 21 is serially connected with a resistor 22 between the battery 79 and ground. The resistor 22 may have a value of 3.3 kilohms, and the resistor 21 may have a value of 22 kilohms. The junction between the resistors 21 and 22 is coupled to the emitted electrode of the transistor 20 by a capacitor 24 having a value of .004 microfarad.

The single stage, in this manner, develops the oscillating frequency for heterodyning the carrier. It also functions to mix the oscillator frequency with the carrier and to develop and amplify the intermediate frequency signal. This combined function is possible because the crystal 30 is not included as part of any of the biasing circuits for the electrodes of the transistor 20.

In the specific illustration, the carrier frequency is greater than the heterodyning frequency. When the carrier frequency is higher than the heterodyning frequency, the phases of the currents in the base-to-emitter junction of the transistor 20 are such that the transistor 20 provides for a greater gain.

The intermediate frequency signal is coupled through the narrow band tuned circuitry coupled to the collector electrode of the transistor 20 to the intermediate amplifier including the transistor 40. The emitter electrode of the transistor 40 is connected to ground by an emitter resistor 48 shunted by a capacitor 59. The resistor 48 may have a value of 270 ohms and the capacitor 59 may have a value of 39 microfarads. The emitter electrode of the transistor 40 is also coupled by a capacitor 41 to one end of the secondary winding 38 and to a resistor 43 which is connected to the battery 79. The capacitor 41 may have a value of .05 microfarad and the resistor 43 may have a value of 100 kilohms. The collector electrode of the transistor 40 is coupled by a circuit 54, which is tuned to the intermediate frequency, to a crystal rectifier 56. The rectifier 56 recovers the 500 cycle tone modulated on the intermediate frequency signal, developing the audio signal across the parallel arrangement of a resistor 59 and capacitor 58. The resistor 59 may have a suitable value such as 3.3 kilohms and the capacitor 58 may have a value of .05 microfarad. The 500 cycle tone is reflexed back through a resistor 51 shunted by a capacitor 50 to the capacitor 41 at the emitter electrode of the transistor 40. The 500 cycle tone is then provided through a capacitive coupling, a transistor amplifier 65, and a transformer 66 to a transistor amplifier 67. The 500 cycle tone is changed to a D.C. component by the power detection action of the transistor 67. This D.C. component drives the base-to-emitter junction of a transistor 70 so that the transistor 70 acts as a switch to switch a 3 volt battery 80 across the windings of a relay 75. The burst of 500 cycle tone, accordingly, provides for the operation of the relay 75 to in turn provide for the remote control at the receiver.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a radio receiver for an amplitude modulated carrier of particular frequency, an antenna; a first tuned circuit coupled to said antenna having a maximum response at said particular frequency; a combined mixer and oscillator stage including a transistor having base, emitter and collector electrodes, a second tuned circuit coupled to said collector electrode and tuned to a predetermined frequency different than said particular frequency, said second tuned circuit including a first inductor, biasing means including said first inductor coupled to said collector electrode, biasing means coupled to said emitter electrode, a regenerative feedback circuit including a piezoelectric crystal having one end coupled to the base electrode and the other end coupled inductively to the collector-biasing means, a second inductor coupled between said first tuned circuit and said base electrode having an impedance greater than the resonant impedance of the crystal but less than the base-to-emitter impedance of the transistor, biasing means including said second inductor coupled to said base electrode; and an amplifier stage inductively coupled to said first inductor.

2. In a radio receiver for an amplitude modulated carrier of particular frequency, an antenna, a first tuned circuit coupled to said antenna having a maximum response at said particular frequency; a combined mixer and oscillator stage including a transistor having base, emitter and collector electrodes, a second turned circuit coupled to said collector electrode and tuned to a predetermined frequency different than said particular frequency, said second tuned circuit including a first inductor, biasing means including said first inductor coupled to said collector electrode, and a second inductor serially connected with said first inductor, a feedback circuit inductively coupled to said base second inductor and including a tuned crystal coupled to said base electrode, biasing means coupled to said emitter, a third inductor having an impedance greater than the resonant impedance of the crystal but less than the base-to-emitter impedance of the transistor, coupled between said first tuned circuit and said base electrode, and biasing means including said third inductor coupled to said base electrode; and an amplifier stage inductively coupled to said first inductor.

3. In a radio receiver for an amplitude modulated carrier of particular frequency, an antenna; a first tuned circuit coupled to said antenna having a maximum response at said particular frequency; a combined mixer and oscillator stage including a transistor having base, emitter and collector electrodes, a second tuned circuit coupled to said collector electrode and tuned to a predetermined frequency different than said particular frequency, said second tuned circuit including a first inductor, biasing means including said first inductor coupled to said collector electrode, biasing means coupled to said emitter electrode, a second inductor having an impedance greater than the resonant impedance of the crystal but less than the base-to-emitter impedance of the transistor, coupled between said first tuned circuit and said base electrode and, biasing means including said second inductor coupled to said base electrode, a feedback circuit having a tuned crystal with one terminal coupled to said base electrode and the other terminal coupled inductively to said collector-biasing means for controlling the frequency of oscillation of said stage; and an amplifier stage inductively coupled to said first inductor.

4. In a receiver having an antenna for receiving an amplitude-modulated carrier signal, a crystal-controlled autodyne converter converter comprising: a transistor having base, collector, and emitter electrodes; a circuit coupled to the collector electrode and tuned to a frequency other than the frequency of the carrier signal; a first inductor coupled to the tuned circuit; a piezoelectric crystal having a fundamental frequency differing from the carrier frequency by an amount equal to the frequency of the tuned circuit; means for coupling one terminal of the crystal electromagnetically to the first inductor, and further means for coupling the other terminal of the crystal to the base electrode of the transistor, thereby forming a regenerative feedback circuit for producing and controlling a heterodyning current at the fundamental frequency; a second inductor having a first terminal coupled to the antenna, and a second terminal coupled to the base electrode, said second inductor having an impedance greater than the impedance of the crystal at the heterodyning frequency, but less than the base-to-emitter path of the transistor; and means exclusive of the regenerative feedback circuit coupled to the first inductor, to the first terminal of the second inductor, and to the emitter electrode for establishing unidirectional biasing potentials for the transistor.

5. In a radio receiver responsive to an ampliutde-modulated carrier signal and having an antenna for receiving the radiated carrier signal, an autodyne converter for converting the carrier signal to a signal having an intermediate frequency, including:

an amplifying device having input and output terminals and having conductive and nonconductive states and normally operative in the conductive state;

a regenerative feedback circuit coupled between the output and input terminals of the amplifying device and tuned to a heterodyning frequency constituting the difference between the carrier frequency and the intermediate frequency and including a crystal operative at the heterodyning frequency for developing signals at the heterodyning frequency and for introducing the signals at the heterodyning frequency to the input terminal of the amplifying device;

connecting means coupled between the antenna and the input terminal of the amplifying device and having a particular impedance for introducing the carrier signal to the input terminal of the amplifying device and for mixing the carrier signal and the signal at the heterodyning frequency in said amplifier to produce the signal at the intermediate frequency for amplification in the amplifying device;

and means electrically isolated from the regenerative feedback circuit and coupled at least to the input terminal of the amplifying device and to the connecting means for biasing the amplifying device to the conductive state.

6. In a radio receiver responsive to an amplitude-modulated carrier signal and having an antenna for receiving the radiated carrier signal, an autodyne converter for converting the carrier signal to a signal having an intermediate frequency, including:

an amplifying device having input and output terminals and having conductive and nonconductive states and normally operative in the conductive state;

a tuned regenerative feedback circuit including a piezoelectric crystal coupled between the output and input terminals of the amplifying device, the crystal being constructed to be resonant at a heterodyning frequency constituting the difference between the carrier frequency and the intermediate frequency and the regenerative feedback circuit being tuned to the heterodyning frequency to introduce the signal at the heterodyning frequency to the input terminal of the amplifying device;

means coupled between the antenna and the input terminal of the amplifying device and having a particular impedance for introducing the carrier signal to the input terminal of the amplifying device and for mixing the carrier signal and the signal at the heterodyning frequency in said amplifier to produce the signal at the intermediate frequency for amplification in the amplifying device;

and means electrically isolated from the regenerative feedback circuit and coupled at least to the input terminal of the amplifying device for biasing the amplifying device to the conductive state.

7. In a radio receiver responsive to an amplitude-modulated carrier signal and having an antenna for receiving the radiated carrier signal, an autodyne converter for converting the carrier signal to a signal having an intermediate frequency, including:

an amplifying device having input and output terminals and having conductive and nonconductive states;

a regenerative feedback circuit coupled between the output and input terminals of the amplifying device and including a crystal and including a first inductor and a capacitor connected in a parallel relationship and tuned to a heterodyning frequency constituting the difference between the frequency of the carrier signal and the heterodyning frequency, the crystal being resonant at the heterodyning frequency;

connecting means including a second inductor coupled between the antenna and the input terminal of the amplifying device and having a particular impedance for introducing the carrier signal to the input terminal of the amplifying device and for mixing the carrier signal and the signal at the heterodyning frequency in said amplifier to produce the signal at the intermediate frequency for amplification in the amplifying device;

and reactive means electrically isolated from the regenerative feedback circuit and coupled at least to the input terminal of the amplifying device for biasing the amplifying device to a particular one of the conductive and nonconductive states.

8. In a radio receiver responsive to an amplitude-modulated carrier signal and having an antenna for receiving the radiated carrier signal, an autodyne converter for converting the carrier signal to a signal having an intermediate frequency, including:

an amplifying device having conductive and nonconductive states, means operatively coupled to the antenna and to the amplifying device for introducing the carrier signal to the amplifying device, first means including a crystal operatively coupled to the amplifying device and resonant at a heterodyning frequency constituting the difference between the frequency of the carrier signal and the heterodyning frequency and responsive to the carrier signal for producing oscillatory transitions of the amplifying device between the conductive and nonconductive states at the heterodyning frequency, second means operatively coupled to the amplifying device and the first means and resonant at the intermediate frequency for providing a transfer of energy between the first and second means to obtain the production of the signal at the intermediate frequency by the second means, and means operatively coupled to the amplifying device and electrically isolated from the first and second means for biasing the amplifying device to a particular one of the conductive and nonconductive states.

9. The autodyne converter set forth in claim 8 in which the first means includes a first winding and in which the second means includes a second winding and in which the first and second windings are magnetically coupled to each other to provide a transfer of magnetic energy between the windings.

10. In a radio receiver responsive to an amplitude-modulated carrier signal and having an antenna for receiving the radiated carrier signal, an autodyne converter for converting the carrier signal to a signal having an intermediate frequency, including:

an amplifying device having conductive and nonconductive states, means operatively coupled to the antenna and to the amplifying device for introducing the carrier signal to the amplifying device, first means resonant at the intermediate frequency and connected to the amplifying device and including a first winding and responsive to the carrier signal to obtain an operation of the amplifying device alternately in the conductive and nonconductive states for the production of the signal at the intermediate frequency in the first means, and second means resonant at a heterodyning frequency constituting the difference between the frequency of the carrier signal and the intermediate frequency and including a crystal resonant at the heterodyning frequency and further including a second winding magnetically coupled to the first winding to provide a transfer of energy between the first and second means and to provide a feedback of energy to the amplifying device at the heterodyning frequency.

11. The radio receiver set forth in claim 10, including, means connected between the antenna and the amplifying device and provided with impedance characteristics to isolate the antenna and the amplifying device while obtaining an introduction of the carrier signal from the antenna to the amplifying device and to obtain the introduction of energy from the second means to the amplifying device for the sustaining of oscillations between the states of conductivity and nonconductivity in the amplifying device.

References Cited by the Examiner

UNITED STATES PATENTS

| | | | |
|---|---|---|---|
| 1,712,026 | 5/29 | Clark | 250—20.51 |
| 2,582,683 | 1/52 | Dammers | 250—20.32 |
| 2,757,287 | 7/56 | Stanley | 250—20 |
| 2,887,573 | 5/59 | Hruska | 250—20 |
| 2,894,132 | 7/59 | Skyten | 250—20.51 |
| 2,980,795 | 8/61 | Bailey | 250—20.32 |

DAVID G. REDINBAUGH, *Primary Examiner.*

SAMUEL B. PRITCHARD, *Examiner.*